Oct. 3, 1933.                L. G. SIMJIAN                 1,928,677
                POSE REFLECTING PHOTOGRAPHIC APPARATUS
                Filed Oct. 22, 1931        2 Sheets-Sheet 1

Patented Oct. 3, 1933

1,928,677

UNITED STATES PATENT OFFICE 1,928,677

POSE-REFLECTING PHOTOGRAPHIC APPARATUS

Luther G. Simjian, New Haven, Conn.

Application October 22, 1931. Serial No. 570,317

8 Claims. ((Cl. 45—99)

This invention relates to pose-reflecting photographic apparatus, and the objects of the invention are to provide series of movable posing-mirrors any combination of which may be movably adjusted to reflect any one of a variety of poses of the subject to himself; to provide manual means for retiring any mirror not required in such combination; and to provide each of said posing-mirrors with a stop to limit its freedom of movement.

Figure 1:
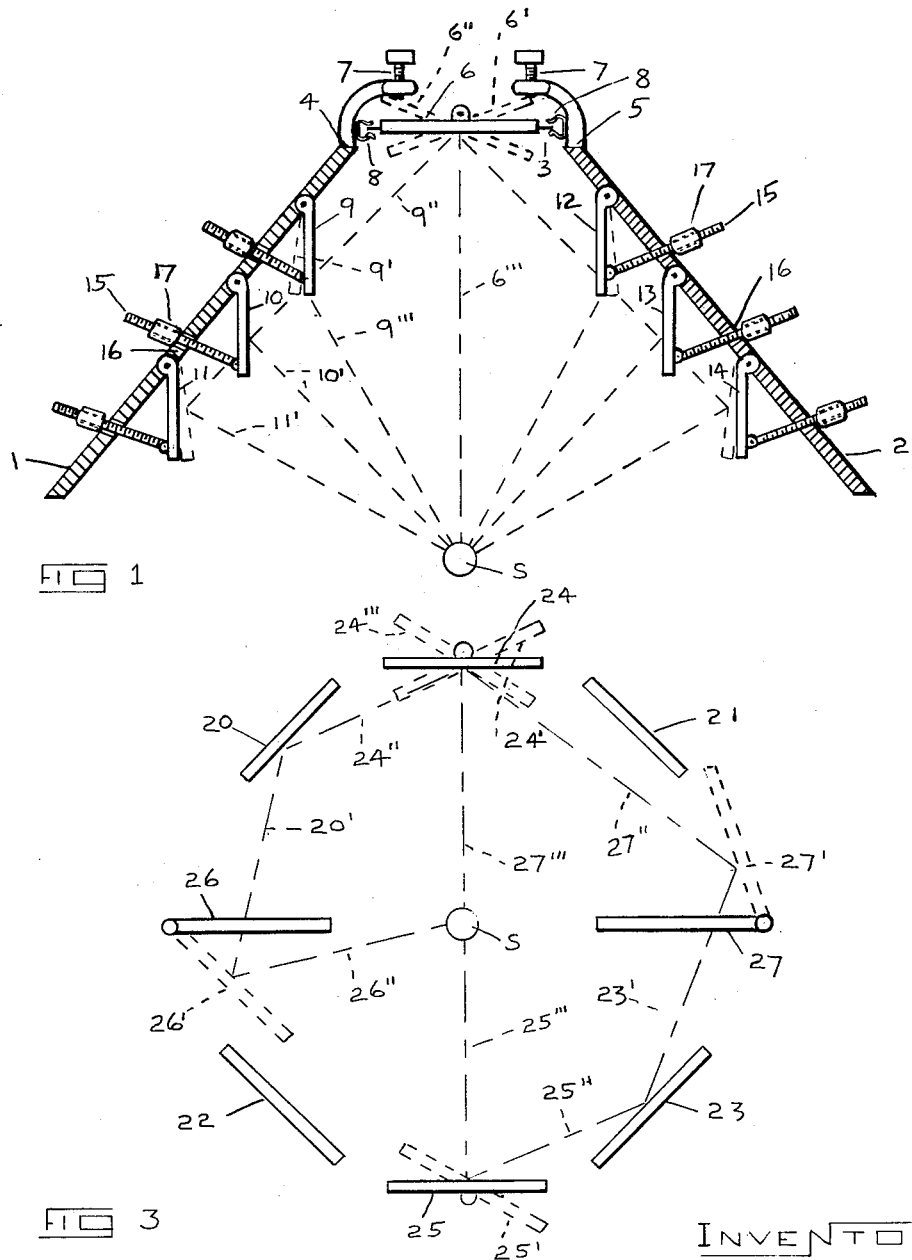
Figure 2:
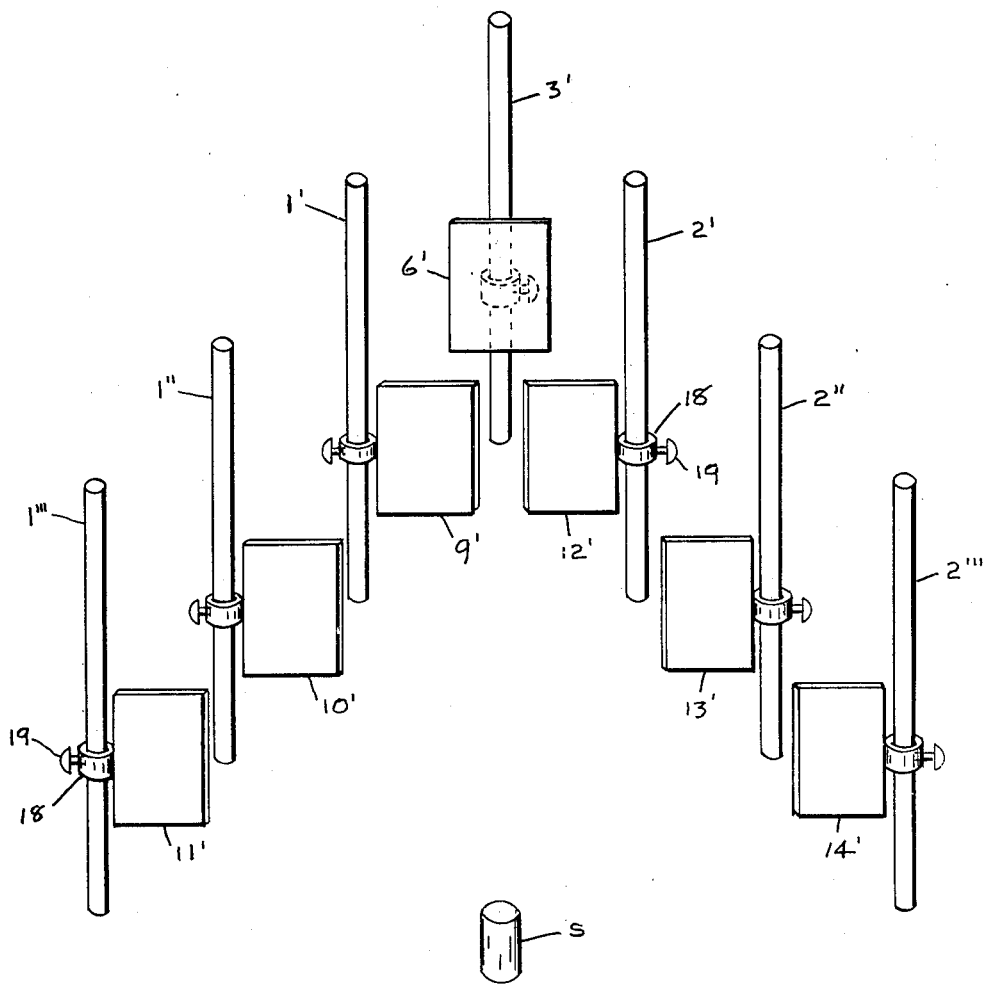

The character of the invention can be best understood by reference to certain combinations of posing-mirrors herein described and illustrated in the accompanying drawings in which Figure 1 is a diagrammatic view of the apparatus; Figure 2 is a diagrammatic view in perspective of another combination of posing mirrors; and Figure 3 is a diagrammatic view of still another combination of posing-mirrors.

The invention about to be described is an improvement of the device disclosed by your petitioner in Patent Number 1,830,770, dated November 10, 1931, for a pose-reflecting system of photographic apparatus, and it is understood that the improved apparatus is adapted and intended to be used, whenever desired, by way of partial substitution or in connection with the said pose-reflecting system thus previously disclosed, or in any other manner.

Referring more particularly to the drawings, the supports 1 and 2 extend along a horizontal plane and relatively converge so that, if each were sufficiently continued, they would form an acute angle, but each support 1 and 2 is made to so terminate as to leave the space 3 between their extremities 4 and 5, respectively, and within the space 3 is positioned the central movable, or image-reflecting, observation mirror 6 having a movement limited only by the stops 7 and the spring clasps 8, each mounted upon one of the supports 1 and 2. Upon the converging supports 1 and 2 there are mounted the series of movable posing-mirrors 9, 10, 11 and 12, 13, 14, each series being aligned forwardly of the said image-reflecting observation mirror 6, each of said posing-mirrors being provided with an arm 15 pivoted to the mirror and extending through an aperture 16 in the support 1 or 2 upon which the mirror is mounted, each arm 15 being threaded and carrying a stop member or handle 17 having a tapped bore to receive the threaded arm 15, the stop 17 being of greater diameter than the diameter of the aperture 16.

Figure 2 illustrates substantially the same arrangement of the central image-reflecting observation mirror and posing-mirrors as that illustrated in the previous figure, but, instead of providing the relatively converging supports 1 and 2, the series of uprights 1' 1" 1''' and 2' 2" 2''' (round in cross-section) are spaced along similar converging lines as those of the supports 1 and 2, and each mirror of the series of posing-mirrors 9' 10' 11' and 12' 13' 14' is mounted upon one of said uprights by means of a collar 18 surrounding an upright and being movable thereon vertically and radially, a thumb-screw 19 held by a tapped bore (not illustrated) provided by the collar 18 being adapted to secure the collar in a fixed position upon said upright, the collar 18 supporting a mirror fixedly secured thereto. An upright 3' similarly supports a central image-reflecting observation mirror 6' in the same relative position to the series of movable posing-mirrors 9' 10' 11' and 12' 13' 14' as the central image-reflecting observation mirror 6 bears to the series of posing-mirrors 9, 10, 11 and 12, 13, 14 illustrated by Figure 1.

Figure 3 illustrates a series of posing-mirrors in another combination or arrangement, the mirrors 20, 21, 22, and 23 being fixed as regards their relative position one to the others, while the mirrors 24, 25, 26 and 27 are alternately arranged with the mirrors 20, 21, 22 and 23 and are made movable, one of the aforesaid moving mirrors serving as the central image-reflecting observation mirror.

In operation, the movable central observation and posing mirrors, in any of the combinations and arrangements herein illustrated or thereby otherwise made possible, may be manually moved into, or retired from, such combination to accomplish the desired relative positions of certain of the posing-mirrors as will reflect the pose of the subject to himself in one or more of a variety of poses sought by the subject. The combination of posing-mirrors illustrated by Figure 1 includes several possible arrangements of mirrors adapted to produce certain desired results. For instance, when the central image-reflecting observation mirror 6 is moved to the dotted position of 6" and the posing-mirror 9 is moved to the dotted position 9' a pose-reflection, along the dotted lines 9''' 9" and 6''' is thereby established. The mirror 9 being retired out of such pose-reflecting line, by means of swinging the mirror against or toward the support 1, the sight-mirror 10 then reflects the pose-reflection along the dotted line 9" and the dotted line 6''' to the subject S. The mirrors 9 and 10 both being retired out of the pose-reflecting line 9" the posing-mirror 11 then reflects the pose-reflection along the dotted lines 9" and 6" to the subject S. The combination of posing-mirrors illustrated by Figure 2 represents the same arrangement provided by the previous figure excepting that the central image-reflecting observation mirror and the sight-mirrors in either series may be retired by the bodily vertical movement of any mirror as well as by a radial movement thereof, the thumb-screw 19 providing in each instance a securing means in any retired position. The combination of posing-mirrors illustrated by Figure 3 represents an arrangement by which the pose-reflection of the subject to himself may include a pose-reflection of the back of the subject. For instance, when the back of the subject S is reflected from the mirror 25, as moved to the dotted position 25', the back of the image is reflected along the dotted line 25" to the fixed mirror 23 which in turn reflects the back of the image along the dotted line 23' to the mirror 27, as moved to its dotted position 27', which in turn reflects the back of the image along the dotted line 27" to the mirror 24, as moved to the dotted position 24', which in turn reflects the back of the image along the dotted line 27''' to the subject himself. It is evident that various other arrangements of the mirrors of the combination may be had to accomplish different results. When the posing-mirror 26 is moved to the dotted position 26' and the image-reflecting observation mirror 24 is moved to the dotted position 24''' a pose-reflection may be established along the dotted lines 26" 20' 24" and 27'''. While this invention is adapted for use as a photographic apparatus, it of course may be used for other purposes within the scope of what hereinafter may be claimed.

I claim:

1. In a pose-reflecting apparatus comprising a fixed location for an observer, an observation mirror in combination with multiple posing mirrors so arranged and positioned at different distances forward of said observation mirror that the one nearest the observation mirror must be moved out of the desired range of reflection of a more distant mirror.

2. In a pose-reflecting apparatus comprising a fixed location for an observer, an observation mirror in combination with multiple posing mirrors so arranged and positioned at different distances forward of said observation mirror that the one nearest the observation mirror must be moved out of the desired range of reflection of a more distant mirror, the movement of such mirror being limited by means of an adjustable stop.

3. In a pose-reflecting apparatus comprising the combination with an observation mirror, of a series of mirrors so placed as to take different poses from a single position of an observer and, so far as unobstructed, reflect them into the observation mirror, and of a pivotally shiftable mounting of the mirrors in said series to move them out of obstructing range of the more remote mirrors.

4. In a pose-reflecting apparatus comprising the combination with an observation mirror, of a series of mirrors so placed as to take different poses from a single position of an observer and, so far as unobstructed, reflect them into the observation mirror, and of a pivotally shiftable mounting of the mirrors in said series to move them out of obstructing range of the more remote mirrors, the movements of such mirrors being limited by means of adjustable stops.

5. In a pose-reflecting apparatus comprising the combination with an observation mirror, of multiple posing mirrors so placed as to take different poses from a single position of an observer and, so far as unobstructed, reflect them into the observation mirror, and of a pivotally shiftable mounting of the posing mirrors to move them out of obstructing range of the more remote mirrors.

6. In a pose-reflecting apparatus comprising the combination with an observation mirror, of multiple posing mirrors so placed as to take different poses from a single position of an observer and, so far as unobstructed, reflect them directly, or through the agency of other posing mirrors, into the observation mirror, and of a pivotally shiftable mounting of the posing mirrors to move them out of obstructing range of the more remote mirrors.

7. In a pose-reflecting apparatus comprising the combination with an observation mirror, of multiple posing mirrors so placed as to take different poses from a single position of an observer and, so far as unobstructed, reflect them into the observation mirror, and of shiftable mountings of the posing mirrors to move them out of obstructing range of the more remote mirrors.

8. In a pose-reflecting apparatus comprising the combination with an observation mirror, of multiple posing mirrors so placed as to take different poses from a single position of an observer and, so far as unobstructed, reflect them directly, or through the agency of other posing mirrors, into the observation mirror, and of a shiftable mounting of the posing mirrors to move them out of obstructing range of the more remote mirrors.

LUTHER G. SIMJIAN.